US009535932B1

(12) United States Patent
DeSantis et al.

(10) Patent No.: US 9,535,932 B1
(45) Date of Patent: Jan. 3, 2017

(54) BACKUP AND RESTORE OF DATABASES

(71) Applicant: ParAccel, Inc., Campbell, CA (US)

(72) Inventors: Robert P. DeSantis, San Jose, CA (US); Velimir Radanovic, San Jose, CA (US); David Wilhite, Jr., Saratoga, CA (US)

(73) Assignee: ParAccel, LLC, Campbell, CA (US)

( * ) Notice: Subject to any disclaimer, the term of this patent is extended or adjusted under 35 U.S.C. 154(b) by 129 days.

(21) Appl. No.: 13/841,602

(22) Filed: Mar. 15, 2013

Related U.S. Application Data

(60) Provisional application No. 61/666,543, filed on Jun. 29, 2012.

(51) Int. Cl.
*G06F 17/00* (2006.01)
*G06F 17/30* (2006.01)

(52) U.S. Cl.
CPC .............. *G06F 17/30289* (2013.01)

(58) Field of Classification Search
CPC ............ G06F 17/30073; G06F 17/30289
USPC ............................................. 707/654
See application file for complete search history.

(56) References Cited

U.S. PATENT DOCUMENTS

| | | | |
|---|---|---|---|
| 5,517,641 A * | 5/1996 | Barry et al. | |
| 5,724,569 A * | 3/1998 | Andres | |
| 5,799,321 A * | 8/1998 | Benson | G06F 17/30575 |
| 5,845,292 A * | 12/1998 | Bohannon | G06F 11/1469 |
| 5,890,167 A * | 3/1999 | Bridge et al. | |
| 5,950,210 A * | 9/1999 | Nelson | G06F 17/30309 |
| 5,995,980 A * | 11/1999 | Olson et al. | |
| 6,003,022 A * | 12/1999 | Eberhard et al. | |
| 6,363,387 B1 * | 3/2002 | Ponnekanti | G06F 17/30348 |
| 6,378,054 B1 * | 4/2002 | Karasudani | G06F 11/1451 707/999.202 |
| 6,397,308 B1 * | 5/2002 | Ofek et al. | 711/162 |
| 6,457,014 B1 * | 9/2002 | Parker | |
| 6,487,561 B1 * | 11/2002 | Ofek et al. | |
| 6,490,598 B1 * | 12/2002 | Taylor | |
| 6,496,944 B1 * | 12/2002 | Hsiao et al. | 714/15 |
| 6,584,474 B1 * | 6/2003 | Pereira | G06F 17/30289 |
| 6,587,856 B1 * | 7/2003 | Srinivasan et al. | 707/802 |

(Continued)

OTHER PUBLICATIONS

Bontempo, Charles, et al., "The IBM Data Warehouse Architecture", Communications of the ACM, vol. 41, No. 9, Sep. 1998, pp. 38-48.*

(Continued)

*Primary Examiner* — Robert Stevens
(74) *Attorney, Agent, or Firm* — Fenwick & West LLP

(57) ABSTRACT

A logical backup of a database is performed that allows physical properties of the database to be preserved upon restore. The physical properties of the database include properties related to storage of the data on the hard disk. Preserving the physical properties of a database allows performance debugging of the source database by performing performance tests on the target database rather than a production system. Incremental backup of metadata of a database is performed to minimize execution of statements that provide the final configuration of the database. Incremental backup is performed by restoring a database using a full backup and applying incremental backups to reach a particular state. The user can inspect the restored database after applying each incremental backup to determine whether the database has reached a desired state.

19 Claims, 5 Drawing Sheets

(56) References Cited

U.S. PATENT DOCUMENTS

| | | | |
|---|---|---|---|
| 6,665,815 B1* | 12/2003 | Goldstein et al. | 714/20 |
| 6,735,605 B2* | 5/2004 | Bird | G06F 17/30371 |
| 6,779,003 B1* | 8/2004 | Midgley | G06F 11/2071 |
| 6,959,369 B1* | 10/2005 | Ashton et al. | 711/162 |
| 6,996,556 B2 | 2/2006 | Boger et al. | |
| 6,999,977 B1* | 2/2006 | Norcott et al. | |
| 7,051,051 B1* | 5/2006 | Stegelmann | G06F 11/1474 |
| 7,058,664 B1* | 6/2006 | Hsu | 707/676 |
| 7,222,133 B1* | 5/2007 | Raipurkar et al. | 707/642 |
| 7,281,023 B2* | 10/2007 | Lou | G06F 17/30348 |
| | | | 707/684 |
| 7,526,508 B2* | 4/2009 | Tan et al. | |
| 7,529,728 B2* | 5/2009 | Weissman et al. | |
| 7,552,358 B1* | 6/2009 | Asgar-Deen et al. | 714/6.1 |
| 7,895,216 B2* | 2/2011 | Longshaw et al. | 707/752 |
| 2003/0220935 A1* | 11/2003 | Vivian et al. | 707/102 |
| 2006/0184561 A1* | 8/2006 | Terada | 707/102 |
| 2007/0124276 A1* | 5/2007 | Weissman et al. | 707/2 |
| 2007/0185936 A1* | 8/2007 | Derk et al. | 707/204 |
| 2008/0281784 A1* | 11/2008 | Zane et al. | 707/3 |
| 2009/0024414 A1* | 1/2009 | Mansour et al. | 705/3 |
| 2009/0287747 A1* | 11/2009 | Zane et al. | 707/204 |
| 2011/0004585 A1* | 1/2011 | Becker et al. | 707/649 |
| 2012/0124081 A1* | 5/2012 | Ebrahimi et al. | 707/769 |

OTHER PUBLICATIONS

Li, Qun, et al., "Research on the Backup Mechanism of Oracle Database", 2009 International Conf. on Environmental Science and Information Application Technology, IEEE Computer Society © 2009, pp. 423-426.*

Hacıgümüş, Hakan, et al., "Providing Database as a Service", ICDE '02, IEEE Computer Society © 2002, pp. 29-38.*

* cited by examiner

BACKUP AND RESTORE OF DATABASES

CROSS REFERENCE TO RELATED APPLICATION

This application claims the benefit of U.S. Provisional Patent Application 61/666,543, entitled "Backup and Restore of Databases," filed on Jun. 29, 2012, which is incorporated by reference in its entirety.

BACKGROUND

The disclosure relates in general to databases and more specifically to backup and restore of databases.

Databases are often used to store data used by an enterprise. In case of disasters, the database may lose information that is critical to the enterprise. For example, the hard disk on which the database is stored may get corrupted and become unreadable. The data loss can also occur due to human error. For example, a system administrator may perform an operation that either deletes or updates data incorrectly.

Databases typically allow the data stored in the database to be backed up. Furthermore, the database can be restored from a backup of the database. Backups are periodically performed in databases that are constantly updated. In case the database becomes corrupt or there is loss of data for some reason, an earlier version of the database can be restored provided the database was backed up.

Performing backups of databases may require significant amount of storage. Furthermore, for large databases, taking backups of databases can be a slow operation. As a result, backups may not be performed very frequently by system administrators. If database backups are not performed frequently, a restored database may have a much older version of data compared to the data that was lost.

SUMMARY

Embodiments allow a database system to take backup of a source database and perform a restore as a target database such that physical properties of the source database are preserved in the target database. Restoring physical properties of source database in a target database may be used for performance debugging of the source database using the target database. As a result, the performance debugging does not affect the performance of the system running the source database.

The database system maintains a source database storing data as tables. The tables are associated with physical properties, for example, physical properties determining how data is stored on a physical storage device. The database system retrieves a request to perform a backup of the source database. The database system retrieves data stored in the database by executing one or more database queries. The database system also retrieves information describing one or more physical properties of tables of the source database. The database system stores the information describing the source database in a backup repository. The database system or another database system may restore the data from the backup repository to a target database system. The restore of the data to the target database system is performed so as to preserve the one or more physical properties of the source database.

The physical properties of the data of the database may be represented as table statistics. The physical properties of the data of the database may be represented as layout of tables in the database. The physical properties of the data may be affected by deleted rows of the table, for example, a large number of deleted rows may cause a table to occupy more storage space than a table storing the same data without the deleted rows. Embodiments preserve one or more of these physical properties of the database upon restore.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

System Environment

Figure 1:
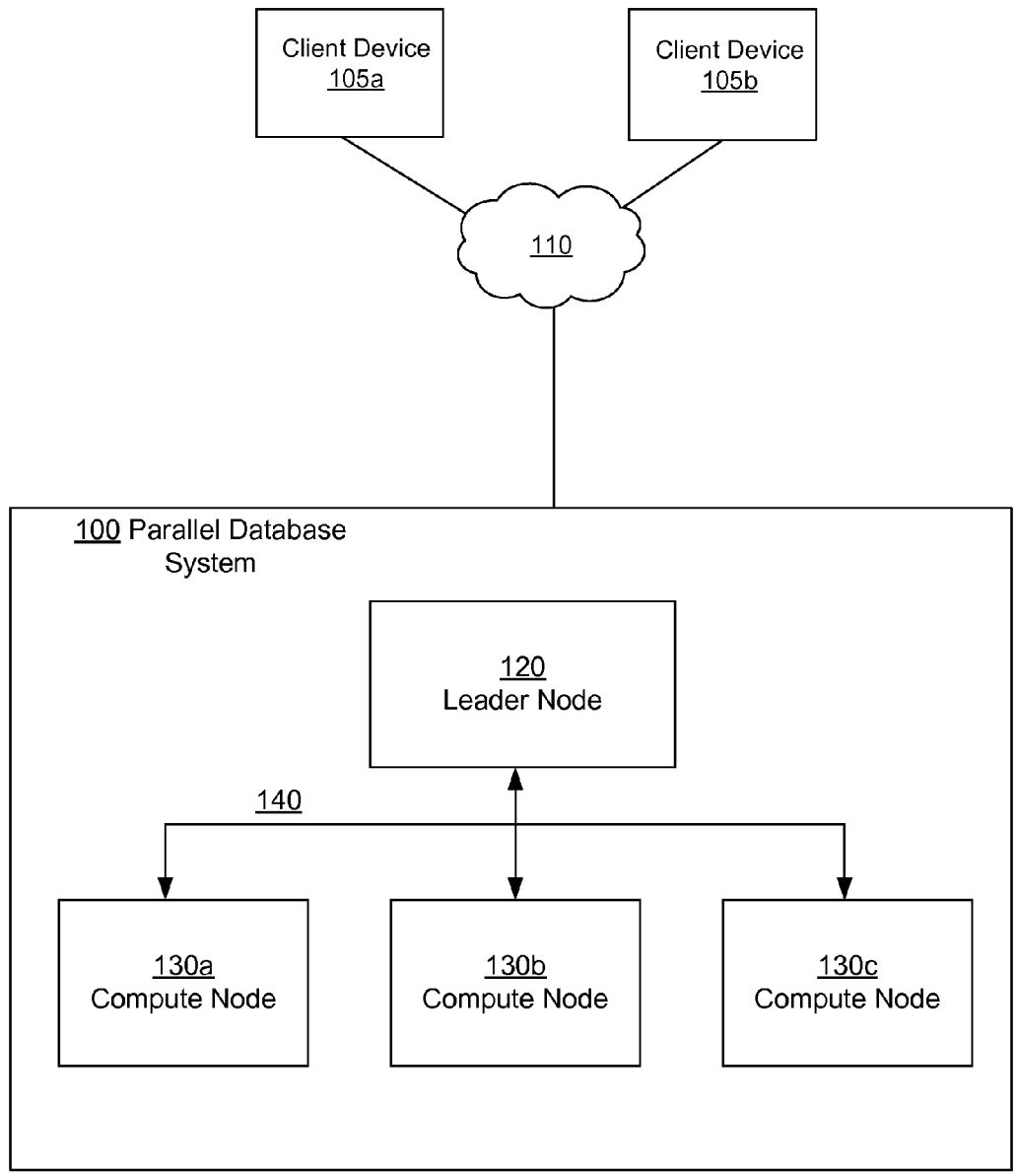
FIG. 1 shows the architecture of a high performance parallel database system for which backups are performed, in accordance with an embodiment of the invention.

FIG. 1 shows the overall system environment illustrating the architecture of a high performance parallel database system 100 (also referred to herein as PADB) for which backups are performed, in accordance with an embodiment of the invention. At the highest level, a PADB system has three main architectural components: The leader node ("leader") 120, the compute nodes 130, and a parallel communication fabric 140. (A letter after a reference numeral, such as "130a," indicates that the text refers specifically to the element having that particular reference numeral, while a reference numeral in the text without a following letter, such as "130," refers to any or all of the elements in the figures bearing that reference numeral.) The leader controls the execution of the compute nodes, and all nodes communicate with each other via the communication fabric 140. For example, leader and compute nodes can be standard x86 servers running Linux. Users and applications may communicate with the system via the leader by using standard interfaces—ANSI SQL via ODBC/JDBC (in general, "the system" refers to a parallel database system herein.)

The leader node (or leader) may be on the network and is intended to interface with external applications and the rest of the computers on a network. The leader node communicates with applications and users via client protocols, including standard ODBC or JDBC, and recognizes ANSI SQL plus database extensions. A leader is required to manage communication with the compute nodes. The leader is responsible for controlling sessions, parsing and optimizing queries, and scheduling execution of the workload, but the leader may or may not participate in data operations. Architectural workload separation by node type (leader and compute) allows for better throughput optimization—the leader's bandwidth is optimized for outward communication and handling of query overhead so each compute node's bandwidth is dedicated to data operations.

Compute nodes are the high level component responsible for processing and storing data. Each node stores and manages a subset of the rows of each table. For example, if a table has 1 billion rows and there are 20 compute nodes, then about 50 million rows are distributed to each node. Data may be distributed to a particular node based on a hashing algorithm applied to a distribution key, or by round robin. Distribution keys, such as the primary key or other popular join column, are good for even distribution of data, especially when queries will benefit from collocated joins by using the same distribution key. In cases where an inherently balanced distribution key isn't obvious or doesn't exist, round robin distribution may be used to balance the data. By offering multiple methods of data distribution, it is possible to maintain the appropriate balance between data distribution and performance so a parallel database can take best advantage of its resources and provide good parallel efficiency. The parallel database performance is driven by how many compute nodes are present. For example, with some applications, a 50-compute node system may perform almost 5× faster than a 10-compute node system.

Each compute node depends on a set of processes to manage the critical resources of that node. This includes both communication, and secondary storage. In order to achieve maximum parallelism, the system logically partitions data for all tables into multiple subsets per node so that multiple cores can be used to process the data for those tables during queries. These logical partitions are referred to as "slices", and in an embodiment, the number of slices per node is typically configured to correspond to the number of cores per node. Each slice is given a set of query execution processes at system startup, and parallelism is achieved by having the processes of all slices competing for the node's shared resources. Slices communicate with other slices via the communication fabric, but they may not be directly accessed by end user applications. In certain contexts, a slice refers to the portion of data that is allocated to a process (or core) for processing.

In an embodiment, the communication fabric is a high performance fabric based on standard, ubiquitous, 1 or 10 Gigabit Ethernet (GbE) and standard multi-port switches that have full crossbar support. The communication fabric may use a custom protocol to enable highly efficient communication among each of the nodes (leader and compute). It delivers maximum interconnect performance because it is specifically designed for how traffic moves in a complex, parallel database environment (e.g., large intermediate result sets, data redistribution, low rate of packet loss) and therefore uses multiple links simultaneously running multiple data streams. The fabric is implemented internally as multiple independent networks all working on behalf of the database, and while two GbE fabrics may be used for high availability, the parallel database can utilize as many fabrics as are available for increased performance.

Client devices 105 are computing devices that execute client software, e.g., a web browser or built-in client application, to interact with the database system 100 via a network. Note that the terms "client" or "client device," as used herein may refer to software providing respective functionality, to hardware on which the software executes, or to the entities operating the software and/or hardware, as is apparent from the context in which the terms are used. For example, a client device may execute business intelligence software or analytic tools that send interact with a database system. In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the system 100 are typically performed via a network 110, for example, via the internet. The network 110 enables communications between the client device 105 and the system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

Although the system environment disclosed in FIG. 1 illustrates a particular type of parallel architecture, embodiments described herein are not limited to the architecture disclosed. Embodiments apply to other types of parallel architectures as well as single processor systems.

System Architecture

Figure 2:
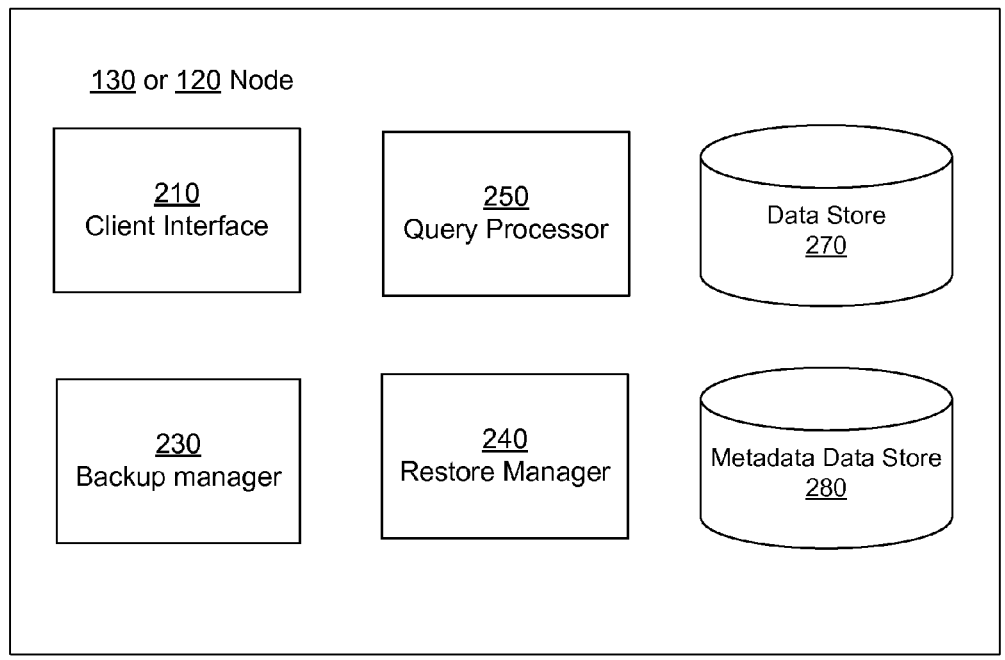
FIG. 2 shows a high level view of internal components and functionality provided by parallel database system 100, in accordance with an embodiment.

FIG. 2 is a high level block diagram illustrating the system architecture of a node of the parallel database system, for example the leader node 120 or the compute node 130, in accordance with an embodiment. The node 120 or 130 comprises a client interface 210, a query processor 250, a backup manager 230, a restore manager 240, a data store 270, and a metadata store 280. In alternative configurations, different and/or additional modules can be included in the system. The client interface 210 allows a node to interact with client devices 105. The query processor 250 processes queries received by the database system. Processing a query may comprise parsing the query, generating an execution plan for the query, and executing the query. The data store 270 stores the data on a persistent storage, for example, a disk and the metadata store 280 stores metadata describing the database, for example, various objects stored in the database including tables, indexes, functions, and so on, and the relations between these objects. The backup manager 230 performs all operations related to taking backups of the database. A backup may be a full backup or an incremental backup. The restore manager 240 restores the database from a given backup. Operations performed by the backup manager 230 and the restore manager 240 are further described in detail herein.

Logical Backup Maintaining Physical Properties of Stored Data

Embodiments perform a logical backup of a database that allows physical properties of the database to be preserved upon restore. The physical properties of the database include properties related to storage of the data on the hard disk. The physical properties are preserved by retrieving information describing the physical properties in the metadata as well as preserving the layout of data stored on a secondary storage device such as a hard disk. Preserving the physical properties of a database allows performance debugging of the source database by performing performance tests on the target database rather than a production system.

Database administrators often need to perform performance debugging of their databases. Performance debugging is typically performed for queries that are critical for an application. For example, if a query takes a long time to execute, applications using the database perform inefficiently. The application performance can be improved by making changes to the database that improve the query performance. In some situations, even if the performance of the query is improved slightly, the performance of an application that invokes the query a large number of times may improve significantly. Performance debugging of queries may be performed by experts in database technology. Performance debugging is preferably performed on a test system rather than a production system to avoid degrading the performance of the production system. Often, performance debugging may be performed on a remote location. As a result, a backup of the database may have to be shipped to the remote location, for example, as a CD (compact disk), DVD (digital video disk), a flash drive, or any other form of permanent storage.

A test database for performing the performance debugging can be prepared by making an exact replica of the database. This is performed by making an exact copy of the underlying data files of the database that may be distributed over various compute nodes and the leader node. However, making an exact replica of the database requires utilizing the same hardware that was used by the source database system. Furthermore, the database may include large amount of data, for example, tables that are unrelated to the portion of the database being debugged. To make an exact replica, unrelated data may have to be copied to the target database. In large database systems, copying all the data that is not required may slow down the process of creating a test system and may also require expensive hardware for the test system.

In contrast, a logical backup of the database can be performed by retrieving specific portions of the database and storing them as part of the replica of the database. For example, the logical backup process can retrieve the data required for backup by performing specific database queries to retrieve data stored in specific tables. The database queries can be specified using an interface provided by the database for accessing information stored in the database, for example, using structured query language (SQL) interface. An SQL statement may retrieve all the data stored in a table for purposes of performing backups, for example, a statement "SELECT*FROM table_name" where table_name is the name of the table being copied (or a SELECT statement that specifies a list of all the names of the columns of the table.) However, copying the database objects by using logical statements, for example, database queries may not preserve the physical properties of the database. Physical properties include properties that determine how the data is physically stored on the secondary storage device such as a hard disk, how the data is distributed in a parallel architecture, etc.

For purposes of performance debugging, it is significant to preserve the physical properties of the data that affect the manner in which the data is stored on the hard disk since the performance of queries typically depends on these physical properties. The performance needs to be preserved whether it is good or bad, i.e., whether the queries are performing slow or fast. For example, even if the performance of the source database is poor, the goal of this process is not necessarily to improve the performance but to obtain the same level performance in the replica of the database so that performance related issues can be debugged.

If the data stored in the replica has different physical properties compared to the source database, the performance of queries in the replica may be different compared to the source database. A slow query in the source database may not be as slow in the backup copy. Even the execution plan generated by the query processor for the database replica may be different compared to a query processor of the source database. Having a performance of the replica that is different from the original database defeats the purpose of performance debugging using the replica.

Embodiments preserve the physical properties of the database that affect the query performance in the backup copy of the database thereby allowing performance debugging using a replica of the database. However, embodiments do not make an exact copy of the original database. Therefore, techniques disclosed herein are not limited to using the exact hardware configuration as the source database. For example, certain system wide objects such as configuration files may not be backed up or if they are backed up, they may not be restored. A user may have to explicitly request the system to restore such data.

In an embodiment, a parallel database system performs backup using two steps. First, a SQL script is produced on the leader node that captures DDL (data definition language) necessary to recreate the tables, views, etc. and (re)populate the table data. Subsequently, the system unloads table data from the compute nodes in a binary format. Upon restore, the parallel database system executes the SQL script which creates the tables, views, etc. The parallel database system then executes a parallel copy commands to load the table data. Objects that are intended to be backed up and restored are tables along with their data, and related/dependent object types such as constraints, views, and statistics. Additionally, scalar UDFs, table functions, and procedural language functions may be backed up and restored as they are database-specific objects.

Backup process can be considered in two distinct phases: backup of catalog/DDL information, and backup of table data. In an embodiment, during the backup of catalog/DDL information, other DDL operations are made to wait. This allows the parallel database system to obtain a consistent snapshot of the system catalogs in DDL form as part of the backup. Once the database system finishes backing up the DDL and starts backing up table data, concurrent DDL operations may be allowed to proceed as per normal transactional semantics.

Some embodiments maintain a backup manifest file containing relevant high level information about a backup necessary for its restoration, for example, database name, backup name, topology, relevant transaction ids, etc. The backup manifest makes the backup file self-describing so that it can be packaged up, moved around, and restored on different systems with different configurations. As such, the manifest is the master metadata file related to a backup.

Figure 3:
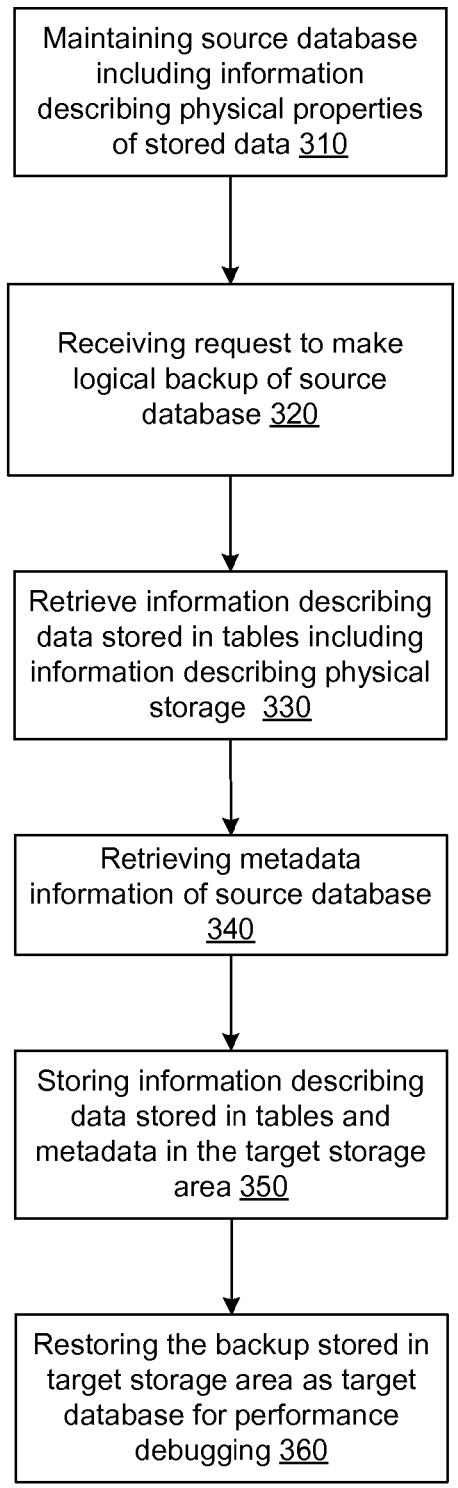
FIG. 3 shows a flowchart illustrating a process for performing a logical backup of a database that preserves physical properties of the database, in accordance with an embodiment.

FIG. 3 shows a flowchart illustrating a process for performing a logical backup of a database that preserves physical properties of the database, in accordance with an embodiment. The steps shown in FIG. 3 may be performed by the backup manager 230 or other components of a database system. The database system maintains 310 a source database that stores tables containing rows of data.

The database maintains information describing physical storage of data. For example, the database may maintain table statistics including sizes of tables, distribution of data in tables, and the like. Table statistics may be used by a query optimizer to generate a query execution plan. Physical properties of data are also determined by virtue of how the data is laid out in the storage without requiring any explicit information being stored in the metadata. For example, if the rows of a table are stored in a sorted order based on a particular key column (or a set of columns) certain queries that return rows in the same sorted order are used to retrieve the data.

The database system receives 320 a request to perform a logical backup of the source database. The backup process stores the database information in a backup repository. The information stored as a backup in the backup repository can be restored as a target database. The backup repository may be stored in a target storage area, which can be a disk of another computer system that is mounted on the database system or a particular type of secondary storage for example, a compact disk (CD) or a DVD (digital video disk). To make a replica of the source database, the database system performs following steps.

The database system retrieves 330 data from each table to be backed up by executing a database query that requests the data stored in the table. The data is retrieved such that the physical properties of data stored on the disk can be preserved when the retrieved data is stored in the target database. The data retrieved is stored the backup repository and can be restored as a target database such that the target database preserves the physical properties of the source database.

In an embodiment, the source database maintains the data by marking a row as deleted when a request to delete the row is received. The data in the deleted row is kept as it is and a flag associated with the row marks the row as deleted. If a large number of rows of the table are deleted, the table that retains deleted rows may occupy significantly more storage space compared to the amount of data stored in the table. When a request to make a backup copy of the database is received, a table may have one or more rows marked as deleted. If an application of the database retrieves values from the table, the deleted rows are not retrieved. However, the query used to retrieve the table data for purposes of making the backup copy retrieves the deleted rows as well. The database system stores the table data including the deleted rows in the backup repository. The table is restored as a target database such that it stores the same number of rows as the corresponding table in the source database including the deleted rows.

In an embodiment, the database system keeps track of deleted rows using a column associated with the table, say, deleted_row. This column is for internal use and is not accessible by applications or users of the database. The value of deleted_row column may one if the row is deleted and zero if the corresponding row is not deleted. All application queries processed by the database system are automatically configured to retrieve only the rows that have deleted_row equal to one. The queries of the backup process are treated differently compared to the queries of user application. Accordingly, the queries of the backup process retrieve all rows of the tables irrespective of the value of deleted_row column. As a result, the backup process retrieves the deleted rows of the table along with the non-deleted rows.

In an embodiment, a table of the source database includes two sets of rows, a first set of rows that stores data in a sorted order based on one or more key columns and a second set of rows storing rows stored in unsorted order with respect to these key columns. For example, the database may store rows of a table in a sorted order. The database implements an update operation on a row as a delete of the original row and an insert of a new row with the updated values. The new row is inserted at the end of the data of the table. As a result, after multiple updates to rows of the table, the table data comprises an initial portion storing rows in a sorted order and a portion at the end of the table storing unsorted rows. The replica of the database obtained by the process illustrated in FIG. 3 stores the table in the target database such that the rows of the table in the target database correspond to the rows of the table in the source database, i.e., the table in the target database also has a first set of rows in a sorted order (including the deleted rows) and a second set of unsorted rows at the end.

In an embodiment, the source database maintains metadata including table statistics for use by a query optimizer. For example, the table statistics may include size of the tables, distribution of values of certain columns of the tables, and the like. The query optimizer may use the size of the tables to optimize queries. For example, the sizes of the tables may be used to determine the order in which tables are joined. The database system retrieves 340 the metadata of the database including the table statistics and stores the table statistics in the target database. As a result, if a query optimizer generates an execution plan for a query, the query optimizer utilizes the same table statistics as available in the source database. As a result, the query optimizer is likely to generate an execution plan identical to the execution plan generated by the source database for the same query. This allows performance debugging of the source database using the target database.

In an embodiment, the source database and the target database are configured to be stored on a multi-processor system. A table may be mapped to multiple processors. Each row of a table is associated with a location indicating the processor to which the row is mapped. To make a replica of the database, the database system retrieves data for each table and stores 350 information in the backup repository including location information of rows. The database system restores 360 the data on the target database such that the locations corresponding to source database are mapped to corresponding locations of the target database. When the database system restores the rows of the table in the target database, each row is mapped to a location in the target database corresponding to the location of the row in the source database.

To summarize, the logical backup is performed such that the backup repository stores information that allows physical properties of the source database to be preserved when the database is restored. These physical properties include, deleted rows, order in which rows are stored in each table copied, table statistics stored in the metadata, location of rows in a parallel database system, and the like. These are only some examples of physical properties that may be preserved. Other embodiments can preserve other physical properties and are not limited to the physical properties described herein.

Embodiments perform logical backup to allow OIDs (object identifiers) of various objects created to be mapped to a new set of OIDs. This is distinct from a backup that copies the files of the database and restores the same OIDs for the objects. The ability to map OIDs from the source database to a new set of OIDs prevents conflicts between OIDs existing on the database and the new database. For example, if the restore is performed on a database that has existing objects, the OIDs of the existing objects may conflict with the OIDs of the objects being restored. However, the ability to remap the OIDs allows the restored objects to be mapped to a set of unused OIDs, thereby avoiding conflicts.

Logical Backup and Restore of Database Metadata

Embodiments perform incremental backup of metadata of a database to minimize execution of statements that provide the final configuration of the database. A representation of the objects of the database is obtained. The DDL logs during a given interval are analyzed to identify which objects need not be created to reach the final configuration. For example, tables that are created and deleted during the interval as well as temporary tables may be skipped while applying the logs to the database configuration.

Databases store information comprising data as well as metadata. The metadata describes various database objects stored in the database, their properties, and relationships between them. The metadata may describe various objects of the database including tables, views, functions, indexes, etc. For example, the metadata information describing each table may comprise the various columns of the database, the type of data stored in each column, whether any indexes are created for the table, and so on. The metadata may also store relationships between tables, for example, any foreign key relations or a view may have a dependency relationship with the table (or tables) on which the view is based. Each relationship may be considered as having a source and a target object. In certain situations, if the target object of a relationship of deleted in the database, the source object of the relationship also needs to be deleted. For example, if a view depends on a table, and the table is dropped from the database, the view must be dropped as well. In an embodiment, each relationship stored in the metadata may specify whether the source object needs to be deleted upon deletion of the target object. Alternatively, this information may be inferred based on the types of the objects in the relationship (at runtime).

A backup of a database needs to preserve data as well as metadata of the database. Embodiments generate a DDL script to be executed on a configuration of the database to obtain the final (desired) configuration of the database. The database system build a dependency graph based on an initial state of a database. The dependency graph comprises nodes representing database objects and edges representing dependencies between objects. The database system receives a list of DDL statements that need to be executed to reach a final configuration of the database from an initial configuration. Statements are identified in the list of DDL statements that correspond to creation of an object and deletion of the same object such that the object is never present in the final configuration. The database system identifies any objects that are present during the execution of the list of DDL statements but get deleted during the execution of the statements. The embodiments generate an optimized set of statements that eliminate one or more statements that create and delete objects that are absent from the final configuration. The optimized set of statements is executed to obtain the final configuration. The optimized set of statements is more efficient to execute compared to the original set of statements. The statements that are deleted from the list of DDL statements may include temporary objects that are limited to the scope of execution of the DDL script or to a smaller scope of execution. The database system may also eliminate statements that modify objects that never make it to the final configuration and are deleted before the final configuration is achieved.

Figure 4:
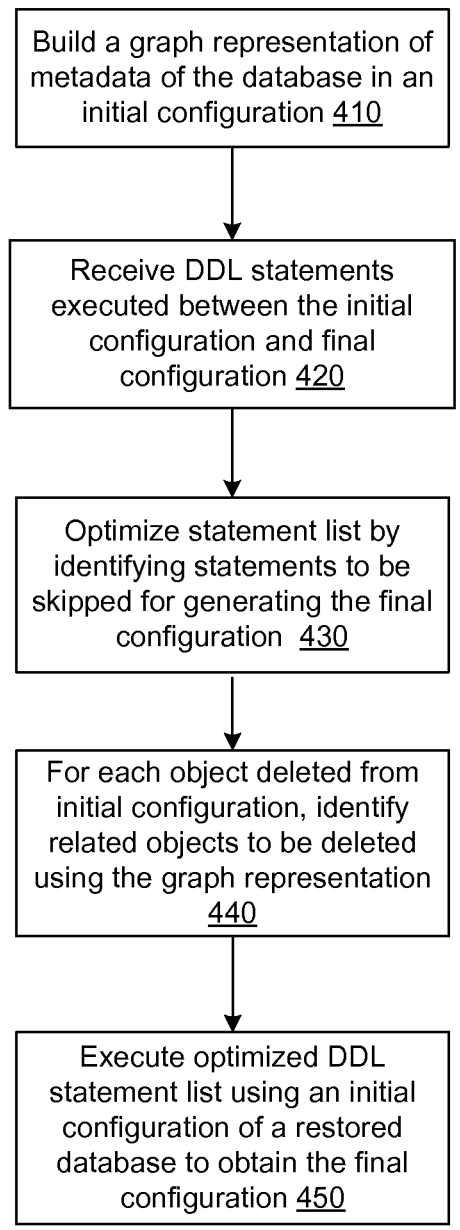
FIG. 4 shows a flowchart illustrating a process for backup and restore or metadata of a database, in accordance with an embodiment.

FIG. 4 shows a flowchart illustrating a process for incremental backup and restore or metadata of a database, in accordance with an embodiment. The database system builds 410 a graph representation of the objects of the database. The graph representation comprises nodes corresponding to objects of the database and edges corresponding to the relationships between objects. An edge connects a source object with a target object. The database graph representation can be used to determine object dependencies to identify related objects that need to be deleted whenever any target object is deleted.

The database system receives 420 statements that correspond to operations executed by the database system between a first database configuration and a second database configuration. For example, certain tables may be dropped, certain tables may be altered (by adding, deleting, or modifying certain columns, adding indexes etc.) The statements may be obtained from a DDL (data definition language) log associated with the database. Note that transaction logs that are generated due to changes in data may not modify the graph representation. For example, if a row of a particular table is added/deleted/modified, the overall graph representation describing the metadata of the database is not changed. The particular table continues to be represented as a node in the graph and the edges to/from the table stay the same. However, dropping a table results in modification of the metadata graph since the corresponding node needs to be dropped from the graph representation. If the dropped node is a target node for one or more edges, either the edges may be dropped or in certain cases the source object for the corresponding edge may be dropped. For example, the source object may be deleted if the edge specifies a property stating that the source object must be deleted responsive to the target object being deleted.

Embodiments analyze the DDL logs to determine statements corresponding to the actions specified in the DDL log that may be skipped and are not executed in order to obtain the metadata of the final configuration. For example, assume that the incremental backup corresponds to an interval starting from an initial configuration of a database and ending at a final configuration of the database. A table may be created during this interval and dropped before the database reaches the final configuration. This scenario typically happens when users execute DDL scripts to perform certain task. The script may create multiple tables for use within the script and then drop the tables at the end of the script since the tables are not useful outside the scope of the script. Similarly, there may be functions and procedures defined using scripting language that create tables (or other objects) that are used within the scope of the function/procedure and dropped at the end of the function/procedure. Note that these objects that are created and dropped within this interval can be any kind of object including tables, indexes, functions, procedures, views, etc. Other types of objects that are created within the interval that are not available in the final configuration are temporary objects, for example, temporary tables that are created within a well defined scope and are automatically dropped by the database system at the end of this scope.

These statements from the DDL log are identified and are removed (or marked as removed) from the statement list. These statements are removed from the statement list to optimize 430 the statement list. The optimized statement list eliminates statements that generate objects that are not available in the final configuration since they are dropped before the final configuration is reached. Note that a customer may have several such scripts containing DDL statements that generate these objects that never reach the final configuration and these scripts may be executed repeatedly in a given interval. As a result, optimizing the statement list to eliminate these statements can remove a large number of statements from the statement list. This increases the efficiency of the process for restoring the metadata from the incremental backup.

In an embodiment, when the database system determines that an object is not present in the final configuration, i.e., the object gets dropped before the final configuration is reached, the database system identifies all DML (data manipulation language) statements that process data stored in that object. For example, if the object is a table, the database system identifies all the statements that add/delete/modify records in that table. The database system may also eliminate statements that process data stored in that object.

For each object that is deleted from the database, all related objects that need to be deleted are identified 445 using the graph representation of the metadata. The statement list may have to be modified to reflect the operations corresponding to these deletes. The database system executes the optimized statement list over a database configuration obtained by restoring the initial database configuration so as to obtain the final database configuration. The optimized statements list modifies the initial database configuration to modify/add/delete objects of the database so as to obtain the final configuration in a manner that avoids creation/deletion of unnecessary objects that are not available in the final configuration.

Note that the process described herein for taking a backup of metadata of the database is distinct from a process that obtains the metadata by performing a "describe" operation on the database that provides description of the database objects. The output of a describe utility would contain all of the objects in the database. In contrast, embodiments of the invention described here use DDL log to recreate metadata objects which were introduced or modified between the two backups, i.e. embodiments perform incremental backups. Also, embodiments can be used to restore a single database in the catalog (that stores database metadata) which may contain metadata for multiple databases. Accordingly, embodiments can perform incremental restoration of a specific part of the metadata catalog.

Embodiments allow the same database to be restored in multiple target databases in the same database system catalog under different names. For example, database foo can be restored as databases foo1, foo2, and foo3 within the same database system. The OIDs corresponding to each database are renumbered so as to be unique within the database system. This ability is useful, for example, to perform different types of tests using different databases with same structure and information.

Restoring Database from Incremental Backups

Embodiments perform incremental backup of a database to allow a user to restore a database using a full backup and apply incremental backups to reach a particular state. This is useful when the user does not know exactly which state the user wants to restore. The incremental backups are applied and the database made available to users in a read only mode. The database is kept in read-only state to ensure that the database state does not get modified by updates. For example, the updates received by the database during the restore operation may change the state such that the desired state is never reached by applying the incremental restores. In a read-only state of the database users are allowed to execute queries using the database. However users are not allowed to execute DDL statements, execute statements that change data, or even create temporary tables. For example, certain queries including correlated subqueries may create temporary tables. Users are not allowed to execute such queries in the read-only state of the database. Operations that simply change the layout of data without affecting the values stored in the database may be allowed in a read-only state, for example, a defragmentation operation.

Queries are performed to determine whether the current state is the desired state. If the current state is the desired state, the current state is made available is read/write mode. Accordingly, users are allowed to modify data of the database. If the user realizes that the current state applied one too many incremental restores, and the previous state was the desired state, the user starts from the last full backup to reapply the incremental restores to the desired state.

A system administrator may take multiple incremental backups of a database and may have to restore the database to a particular configuration without knowing specifically which incremental backups need to be restored. The system administrator may have to inspect the data for a given configuration of the database to determine whether the database is in the desired state (a database configuration is also referred to as a database state herein). Inspecting the data of the database may comprise executing specific queries on the database to determine whether the database is in the desired configuration. However, to be able to execute the queries, the database must be first restored to a particular configuration.

The desired state of the database may comprise a state in which either certain data is present, certain data is absent, or certain data has specific values. For example, if the database stores accounts of user, the desired state may correspond to a state in which a particular account had a predetermined value. Alternatively, the desired state may be a state in which an aggregate value based on a plurality of accounts had a specific value or a value within a particular range. As another example, the desired state of the database may be when a particular data corresponding to a particular record or an aggregate value based on a set of records changes from one value to another. For example, the desired state may be the state before a particular value in a record changes. Alternatively, the desired state may be when an aggregate value based on a set of records increases above a particular threshold value.

Figure 5:
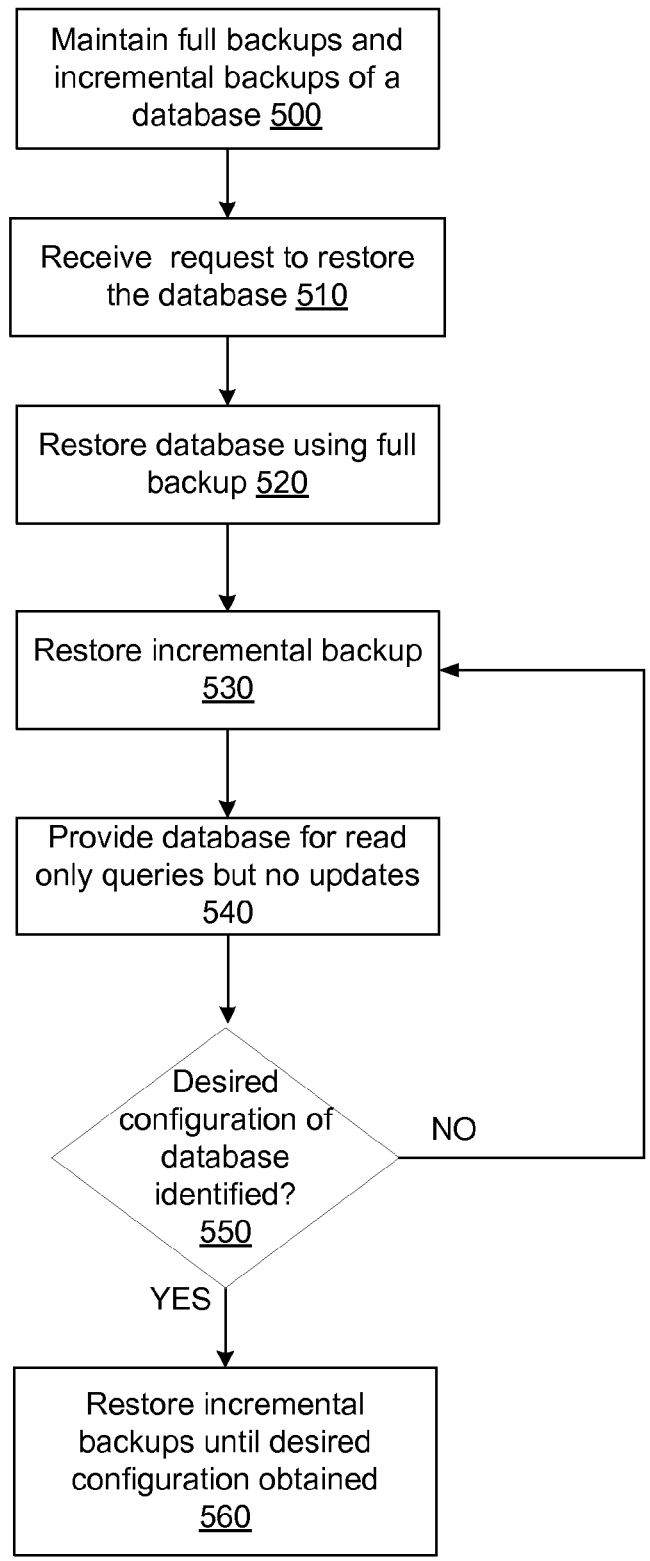
FIG. 5 shows a flowchart illustrating a process for restoring a database from a series of incremental backups, in accordance with an embodiment.

FIG. 5 shows a flowchart illustrating a process for restoring a database from a series of incremental backups, in accordance with an embodiment. Various steps described herein related to restore of databases may be performed by the restore manager 240. The database may maintain 500 full backups and incremental backups. The full backup is performed by taking the required data from the database and storing it in a target location. The incremental backup is obtained by storing the changes performed on the database since a previous full backup or another incremental backup. These changes may be obtained from the database logs that store various operations performed by the database.

Both full backups and incremental backups are taken periodically. The full backups are typically taken less frequently than incremental backups. A full backup may be restored independent of other backups but a particular incremental backup can be restored after a full backup is restored followed by restore of all incremental backups up to that particular incremental backup. For example, a full backup may be taken every Sunday of the week and the incremental backup taken every (remaining) day of the week. To restore an incremental backup of Wednesday, the most recent full backup taken on the Sunday is restored, followed by restore of the incremental backups taken on Monday and Tuesday following the Sunday. However, if the database that has been restored until a Wednesday is available, this restored database may not be used to obtain the database for an earlier day, for example, Tuesday. To obtain the database for Tuesday, the database must be restored again using the previous Sunday's full backup followed by the Monday and Tuesday's backups.

The restore manager 240 receives 510 a request to restore the database. The request may specify the full backup that needs to be used for the restore. However, the request may not specify which incremental backups need to be restored. The requestor needs to inspect the data restored at each stage to determine whether the database has the desired state or not.

The restore manager 240 performs a restore 520 using the full backup. The restore manager 240 also performs a restore 530 using the next incremental backup. After the restore using the incremental backup, the database is provided for queries (read only) but not for updates. The database system returns error if update requests are received by the database system and reports failure of the update operation. Updates are disallowed because if the database is updated, subsequent restores of incremental backups may not be possible. In this state, read only queries are received and processed that can help a system administrator or any user determine 550 whether the database has reached a desired state that the requestor wanted to restore.

The user examining the state of the database may determine that the currently restored database corresponds to the desired state. In this situation the database can be subsequently made available for updates as well as queries, i.e., as a fully operational database. The user examining the database may determine that the database has not reached the desired state and further incremental backups need to be restored. In this situation, the database system performs restore 530 of the next incremental backup that follows the previously restored backup and the above process is repeated until the database reaches a desired state.

The user examining the database may determine that the desired state corresponds to the previous restore of the incremental backup and the current restore operation applied one too many restores of incremental backups. Since the database system is unable to reverse the changes applied by the recent most restore operation, the database system restarts the process of restoring 560 from the full backup and applying the restores from the incremental backups until the incremental backup identified as the final incremental backup that is required to obtain the desired state of the database. In an embodiment, a copy of the database obtained by restoring the full backup may be made and stored for future use to avoid having to repeat the process of restoring from the full backup. Subsequently the restored database can be made available for queries and updates as a fully operational database.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   maintaining a source database storing data as tables, the tables including at least a particular table;
   receiving a database query associated with a performance issue on the source database, the database query processing data of the particular table;
   creating a backup repository for the source database, the creating comprising:
      retrieving data of one or more tables of the source database by executing one or more database queries, the one or more tables including the particular table, wherein execution of the one or more database queries retrieves rows of the one or more tables including rows marked as deleted in the source database, wherein the rows marked as deleted were deleted in the source database before creating the backup repository, and storing the retrieved data in a backup repository;

restoring a target database using the backup repository, the restored target database storing the particular table including rows of the particular table marked as deleted in the source database; and executing the database query on the target database to analyze the performance issue of the database query on the source database, the executing comprising processing the restored particular table, wherein the restored particular table stores rows marked as deleted in the source database.

2. The computer-implemented method of claim 1, further comprising:

retrieving from the source database, statistics describing the one or more tables of the source database; and wherein the target database uses the retrieved statistics for optimizing queries executed by the target database.

3. The computer-implemented method of claim 2, wherein the retrieved statistics comprises sizes of tables.

4. The computer-implemented method of claim 2, wherein the retrieved statistics comprises distribution of values of one or more columns of a table of the database.

5. The computer-implemented method of claim 1, wherein the source database and the target database are stored on a plurality of computers and each row of each table is associated with a location indicating the computer on which the row is stored, the method further comprising:

retrieving additional information from the database, the additional information comprising data describing each table including location information associated with rows of the table; and restoring a target database comprises storing the retrieved data for each table by storing each row in a location of the target database that maps to a corresponding location of the row in the source database.

6. The computer-implemented method of claim 1, wherein a table of the source database comprises a first set of rows storing data in sorted order based on at least one key and a second set of rows stored in an unsorted order with respect to the at least one key, wherein restoring a target database comprises storing the retrieved data for each table maintaining the sort order of the first set and the unsorted order of the second set.

7. The computer-implemented method of claim 1, further comprising:

retrieving additional information describing a particular order in which rows of the one or more tables are stored in the source database and the restoring comprises storing the rows of the one or more tables in the target database in the particular order.

8. The computer-implemented method of claim 1, wherein the source database is processed using a system having a first hardware configuration and the target database processed using a system having a second hardware configuration distinct from the first hardware configuration.

9. The computer-implemented method of claim 1, wherein each of the one or more tables is associated with physical properties determining a physical layout of data stored on a persistent storage device of the source database, wherein restoring the target database using the backup repository such that the physical layout of the one or more tables in a persistent storage device of the target database matches the physical layout of the one or more tables in the persistent storage device of the source database.

10. A non-transitory computer readable storage medium storing instructions for:

maintaining a source database storing data as tables, the tables including at least a particular table;

receiving a database query associated with a performance issue on the source database, the database query processing data of the particular table;

creating a backup repository for the source database, the creating comprising:

retrieving data of one or more tables of the source database by executing one or more database queries, the one or more tables including the particular table, wherein execution of the one or more database queries retrieves rows of the one or more tables including rows marked as deleted in the source database, wherein the rows marked as deleted were deleted in the source database before creating the backup repository, and storing the retrieved data in a backup repository;

restoring a target database using the backup repository, the restored target database storing the particular table including rows of the particular table marked as deleted in the source database; and executing the database query on the target database to analyze the performance issue of the database query on the source database, the executing comprising processing the restored particular table, wherein the restored particular table stores rows marked as deleted in the source database.

11. The non-transitory computer readable storage medium of claim 10, further storing instructions for:

retrieving from the source database, statistics describing the one or more tables of the source database; and wherein the target database uses the retrieved statistics for optimizing queries executed by the target database.

12. The non-transitory computer readable storage medium of claim 11, wherein the retrieved statistics comprises sizes of tables.

13. The non-transitory computer readable storage medium of claim 11, wherein the retrieved statistics comprises distribution of values of one or more columns of a table of the database.

14. The non-transitory computer readable storage medium of claim 10, wherein the source database and the target database are stored on a plurality of computers and each row of each table is associated with a location indicating the computer on which the row is stored, further storing instructions for:

retrieving additional information from the database, the additional information comprising data describing each table including location information associated with rows of the table; and restoring a target database comprises storing the retrieved data for each table by storing each row in a location of the target database that maps to a corresponding location of the row in the source database.

15. The non-transitory computer readable storage medium of claim 10, wherein a table of the source database comprises a first set of rows storing data in sorted order based on at least one key and a second set of rows stored in an unsorted order with respect to the at least one key, wherein restoring a target database comprises storing the retrieved data for each table maintaining the sort order of the first set and the unsorted order of the second set.

16. The non-transitory computer readable storage medium of claim 10, wherein each of the one or more tables is associated with physical properties determining a physical layout of data stored on a persistent storage device of the source database, wherein restoring the target database using the backup repository such that the physical layout of the one or more tables in a persistent storage device of the target database matches the physical layout of the one or more tables in the persistent storage device of the source database.

17. A computer-implemented system comprising:
a computer processor; and
a non-transitory computer-readable storage medium storing instructions for:
 maintaining a source database storing data as tables, the tables including at least a particular table;
 receiving a database query associated with a performance issue on the source database, the database query processing data of the particular table;
 creating a backup repository for the source database, the creating comprising:
  retrieving data of one or more tables of the source database by executing one or more database queries, the one or more tables including the particular table, wherein execution of the one or more database queries retrieves rows of the one or more tables including rows marked as deleted in the source database, wherein the rows marked as deleted were deleted in the source database before creating the backup repository, and
  storing the retrieved data in a backup repository;
 restoring a target database using the backup repository, the restored target database storing the particular table including rows of the particular table marked as deleted in the source database; and
 executing the database query on the target database to analyze the performance issue of the database query on the source database, the executing comprising processing the restored particular table, wherein the restored particular table stores rows marked as deleted in the source database.

18. The computer-implemented system of claim 17, wherein the non-transitory computer-readable storage medium further stores instructions for:
 retrieving from the source database, statistics describing the one or more tables of the source database, and wherein the target database uses the retrieved statistics for optimizing queries executed by the target database.

19. The computer-implemented system of claim 17, wherein the source database and the target database are stored on a plurality of computers and each row of each table is associated with a location indicating the computer on which the row is stored, wherein the non-transitory computer-readable storage medium further stores instructions for:
 retrieving additional information from the database, the additional information comprising data describing each table including location information associated with rows of the table; and
 restoring a target database comprises storing the retrieved data for each table by storing each row in a location of the target database that maps to a corresponding location of the row in the source database.

* * * * *